United States Patent
Shi et al.

(10) Patent No.: US 10,784,540 B2
(45) Date of Patent: Sep. 22, 2020

(54) IONIC LIQUID GEL FOR ELECTROLYTE, METHOD OF AND INK FOR MAKING THE SAME, AND PRINTED BATTERIES INCLUDING SUCH IONIC LIQUID GELS AND/OR ELECTROLYTES

(71) Applicants: Chaojun Shi, Alameda, CA (US); Christine C. Ho, Fremont, CA (US); J. Devin Mackenzie, Lafayette, CA (US)

(72) Inventors: Chaojun Shi, Alameda, CA (US); Christine C. Ho, Fremont, CA (US); J. Devin Mackenzie, Lafayette, CA (US)

(73) Assignee: Imprint Energy, Inc., Alameda, CA (US)

( * ) Notice: Subject to any disclaimer, the term of this patent is extended or adjusted under 35 U.S.C. 154(b) by 272 days.

(21) Appl. No.: 15/474,763

(22) Filed: Mar. 30, 2017

(65) Prior Publication Data

US 2017/0288280 A1     Oct. 5, 2017

Related U.S. Application Data

(60) Provisional application No. 62/316,115, filed on Mar. 31, 2016.

(51) Int. Cl.
    *H01M 10/42*    (2006.01)
    *H01M 10/054*   (2010.01)
    (Continued)

(52) U.S. Cl.
    CPC ....... *H01M 10/4235* (2013.01); *H01M 4/244* (2013.01); *H01M 4/38* (2013.01);
    (Continued)

(58) Field of Classification Search
    None
    See application file for complete search history.

(56) References Cited

U.S. PATENT DOCUMENTS

| | | | |
|---|---|---|---|
| 2004/0199015 A1* | 10/2004 | Yuyama | B01D 17/06 564/292 |
| 2011/0065009 A1* | 3/2011 | Lascaud | H01M 12/08 429/405 |

(Continued)

OTHER PUBLICATIONS

Sutto, T.E. "Hydrophobic and Hydrophilic Interactions of Ionic Liquids and Polymers in Solid Polymer Gel Electrolytes." Journal of the Electrochemical Society, 154 (10) p. 101-p. 107 (Year: 2007).*

(Continued)

*Primary Examiner* — Alix E Eggerding
(74) *Attorney, Agent, or Firm* — Kwan & Olynick LLP

(57) ABSTRACT

The disclosure concerns an electrolyte, an electrolyte ink, a battery or other electrochemical cell including the same, and methods of making the electrolyte and electrochemical cell. The electrolyte includes an ionic liquid comprising a hydrophilic or hydrophobic anion, a multi-valent metal cation suitable for use in a battery cell, a polymer binder, and optional additives (e.g., a solid filler). The electrolyte ink includes components of the electrolyte and a solvent. The solvent and the polymer binder (or, when present, the solid filler) have a hydrophilicity, hydrophobicity or polarity similar to or matching that of the ionic liquid's anion, or form hydrogen bonds with the ionic liquid's anion. The electrolyte includes a solid inorganic filler that provides mechanical support form hydrogen bonds with the anion and/or a counterpart anion of the multi-valent metal cation, and links with a material in an adjacent layer of the electrochemical cell.

22 Claims, 1 Drawing Sheet

(51) Int. Cl.
- *H01M 4/38* (2006.01)
- *H01M 4/24* (2006.01)
- *H01M 6/22* (2006.01)
- *H01M 6/18* (2006.01)
- *H01M 6/40* (2006.01)
- *H01M 10/0565* (2010.01)
- *H01M 10/04* (2006.01)

(52) U.S. Cl.
CPC ............ *H01M 6/181* (2013.01); *H01M 6/22* (2013.01); *H01M 6/40* (2013.01); *H01M 10/054* (2013.01); *H01M 10/0565* (2013.01); *H01M 2010/0495* (2013.01); *H01M 2300/0045* (2013.01); *H01M 2300/0085* (2013.01)

(56) References Cited

U.S. PATENT DOCUMENTS

| | | | | |
|---|---|---|---|---|
| 2011/0305959 A1* | 12/2011 | Friesen | ............ | H01M 10/0567 429/405 |
| 2012/0321967 A1* | 12/2012 | Wolfe | .................. | H01M 12/06 429/403 |
| 2014/0059820 A1* | 3/2014 | Wright | ................. | H01M 4/381 29/25.03 |
| 2014/0302373 A1* | 10/2014 | Lockett | ................ | C07D 233/58 429/124 |

OTHER PUBLICATIONS

Fuller et al. "Ionic liquid-polymer gel electrolytes from hydrophilic and hydrophobic ionic liquids." Journal of Electroanalytical Chemistry 459 (1998) 29-34. (Year: 1998).*

Sutto. "Hydrophobic and Hydrophilic Interactions of Ionic Liquids and Polymers in Solid Polymer Gel Electrolytes." Journal of the Electrochemical Society, 154 10 p. 101-p. 107 2007 (Year: 2007).*

European Search Report and the European Search Opinion dated Jun. 13, 2017; European Patent Application No. EP 17164163.2; 9 pgs.; European Patent Office; Munich, Germany.

European Application Serial No. 17164163.2, Office Action dated Nov. 29, 2019.

* cited by examiner

IONIC LIQUID GEL FOR ELECTROLYTE, METHOD OF AND INK FOR MAKING THE SAME, AND PRINTED BATTERIES INCLUDING SUCH IONIC LIQUID GELS AND/OR ELECTROLYTES

CROSS REFERENCE TO RELATED APPLICATION

This application claims the benefit of U.S. Provisional Patent Application No. 62/316,115, filed on Mar. 31, 2016, incorporated herein by reference as if fully set forth herein.

FIELD OF THE INVENTION

The present invention relates generally to electrolytes and electrochemical cells, and more specifically to improved electrolytes and electrolyte inks including an ionic liquid, a multivalent metal salt, a polymer binder and (in the case of the inks) a solvent, where the polymer binder and/or solvent have a hydrophilicity, hydrophobicity or relative polarity similar to or matching that of the anion in the ionic liquid. Alternatively, the polymer binder and/or solvent may form one or more hydrogen bonds with the ionic liquid.

DISCUSSION OF THE BACKGROUND

Polymer and gel electrolytes incorporating ionic liquids (IL) have many benefits across a broad range of fields. Key attributes that are desired in an ionic liquid polymer or gel electrolyte include high ionic conductivity and electrochemical ability, good mechanical and structural rigidity, ionic liquid stability within the polymer so that it is not subject to gel syneresis or does not leach or sweat out over time or due to perturbations like temperature, pressure, or electric field, thermal stability at low and high temperatures, and ability to form the polymer or gel electrolyte in a custom shape.

There have been three strategies to preparing IL-based polymer gel electrolytes, or ionogels, including (1) infusing polymers with ILs, (2) polymerization or crosslinking of monomers in ILs, and (3) synthesizing polymeric ionic liquids (PILs). For the first type of ionogel, it is a common strategy to increase the IL-to-polymer loading within the ionogel to increase the ionogel ionic conductivity. However, with higher loadings of IL to polymer, the mechanical stability and rigidity of the polymer film decrease substantially, and with high loadings of IL, the IL typically becomes unstable within the polymer over time, leading to syneresis, leaching or sweating of the IL from the polymer. A common method to improve the mechanical properties of the ionogel while also increasing its ionic conductivity is to add a solid filler, such as silica, ZnO, $TiO_2$, or $Al_2O_3$ to the ionogel. The size, morphology, loading and chemical nature of the solid filler can influence the resulting composite ionogel performance. Polymerization and cross-linking are used to strengthen the structural and dimensional properties of the second type of ionogel.

Polymeric ionic liquids (PILs) have been recognized recently as innovative polyelectrolytes. PILs can be made by thermal or UV-induced polymerization of ionic liquid monomers, such as vinyl- or allyl-substituted conventional ionic liquids. PILs combine some characteristics of ionic liquids with the general property profile of macromolecules, and have found potential in energy-/environment-/catalysis-oriented applications, such as polymeric ion conductors and polymer electrolytes (e.g., in an all-solid-state battery), electrode binders, cross-linkers and coatings, "smart" dispersants and stabilizers, and absorbents for solvent purification and $CO_2$ utilization.

This "Description of the Background" section is provided for background information only. The statements in this "Description of the Background" section are not an admission that the subject matter disclosed in this section constitutes prior art to the present disclosure, and no part of this "Description of the Background" section may be used as an admission that any part of this application, including this section, constitutes prior art to the present disclosure.

SUMMARY OF THE INVENTION

Aspects of the present invention concern an electrolyte, an electrolyte ink, an electrochemical cell, and methods of making the same. The electrolyte, for example, comprises an ionic liquid comprising a hydrophilic or hydrophobic anion, a multi-valent metal cation, and a polymer binder and optionally a solid filler having a hydrophilicity, hydrophobicity or polarity similar or matched to that of the anion. The multi-valent metal cation may be suitable for use in an electrochemical cell such as a battery cell. The polymer binder mechanically supports the electrolyte and has a porosity, swellability and/or impregnability enabling infusion, impregnation, percolation or doping with the ionic liquid and the multi-valent metal cation. In the electrolyte, the polymer binder has a hydrophilicity, hydrophobicity or polarity matched to that of the anion. Similarly, the ionic liquid may comprise a hydrophilic or hydrophobic cation, and the polymer binder (and optionally, the solid filler) may have a hydrophilicity, hydrophobicity or polarity similar or matched to that of the cation. The electrolyte ink may further comprise a solvent that has a hydrophilicity, hydrophobicity or polarity matched to that of the anion. In some embodiments, the electrolyte may comprise water. Alternatively, the polymer binder and/or solvent may form hydrogen bonds with the ionic liquid. The electrochemical cell comprises a cathode layer, the present electrolyte, and an anode layer.

In various embodiments of the present invention, the ionic liquid comprises the hydrophilic anion, and the polymer binder forms hydrogen bonds with the hydrophilic anion. Additionally or alternatively, when the ionic liquid comprises the hydrophilic anion, the hydrophilic anion may contain one or more atoms with a lone electron pairs that form strong hydrogen bonds. In such embodiments, the ionic liquid may include a cation selected from the group consisting of imidazolium, pyrrolidinium, phosphonium and tetraalkyl ammonium, and the anion may be selected from the group consisting of methanesulfonate, trifluoromethanesulfonate, toluenesulfonate, tetrachloroborate, formate, acetate, propionate, perchlorate and nitrate.

In some embodiments, the ionic liquid (IL) may include a hydrophobic anion, and the polymer binder may be hydrophobic. In such embodiments, the ionic liquid may include a cation selected from the group consisting of imidazolium, pyrrolidinium, pyridinium, phosphonium and tetraalkyl ammonium, and the anion may be selected from the group consisting of bis((methyl)sulfonyl)imide, bis(trifluoromethane)sulfonimide, trialkyl borate, tetraaryl borate, and $C_6$-$C_{20}$ carboxylate.

The solid filler may be a solid inorganic filler. The solid inorganic filler may be selected from the group consisting of silica, alumina, an aluminosilicate, titanium dioxide, zinc oxide, and combinations thereof, and can have any of a variety of different particle sizes or particle size ranges. In some embodiments, the IL anion may form hydrogen bonds with the filler. Additionally or alternatively, the anion may form hydrogen bonds with the polymer binder.

In various embodiments, the polymer binder may include an —OH group, an —NH group, an —F group, or an —SH group, and the anion may have at least one atom with a lone pair of electrons. Thus, the polymer binder may include polyvinyl alcohol, a poly(alkyl acrylate or methacrylate (e.g., poly[methyl methacrylate], poly[ethyl methacrylate], etc.), or cellulose. In addition, the polymer binder may include polymers, copolymers and/or rubbers of trifluoroethylene, tetrafluoroethylene, vinylidene difluoride hexafluoropropylene, styrene and/or butadiene. Furthermore, the polymer binder may include a polyester, a polyaniline, a polyether, a polyimide, or a polymer or copolymer of trifluoroethylene, tetrafluoroethylene, vinylidene chloride, an ethylene oxide, acrylic acid, methacrylic acid, and/or an acrylate and/or methacrylate ester, or a blend thereof. In some embodiments of the present invention, a counterpart anion of the multi-valent metal cation may form hydrogen bonds with the polymer binder.

In addition, the electrolyte may include an additive selected from the group consisting of carbonates, glycerol carbonates, glycols, sugar alcohols, glycerol, polyols, ethylene oxides, propylene oxides, polymers and copolymers of ethylene and propylene oxides, ethers, fluorinated carbonates, and fluorinated ethers in an amount of 0.001-15% by weight (or other range, such as 0.001-10% by weight, within this range) of the electrolyte. The electrolyte may also comprise a transport-enhancing species selected from the group consisting of carbonates, glycols, ethylene oxides, propylene oxides, polymers and copolymers of ethylene and propylene oxides, ethers, fluorinated carbonates, and fluorinated ethers, in an amount <10% by weight of the electrolyte.

Generally, the solvent may be included in an amount that is more than 10% by weight of the electrolyte. The solvent may have a hydrophilicity, hydrophobicity or polarity similar or matched to that of the anion, or may form hydrogen bonds with the anion. In various embodiments, the solvent and the anion are hydrophilic. In such cases, the solvent may include a $C_1$-$C_4$ mono-, di- and/or trialkylamine, N-methylpyrrole, N-methylpyrrolidine, N-methylpyrrolidone, N-methylpiperidine, N-methylimidazole, pyridine, or an aqueous salt thereof. Alternatively, the solvent may include a phosphate or phosphite (e.g., a compound of the formula $(RO)_3PO_x$, where each R is independently a $C_1$-$C_4$ alkyl and/or phenyl [which may be substituted with up to 3 $C_1$-$C_4$ alkyl groups]).

Another aspect of the present invention concerns an electrochemical cell that comprises a cathode layer, the electrolyte described above, and an anode layer. In some embodiments, the electrochemical cell includes a solid filler, and the material in at least one of the cathode layer and the anode layer may be linked to the solid filler. At least one of the cathode layer and the anode layer may include a metal oxide, and the polymer binder may be linked to the metal oxide.

The polymer binder may comprise a cross-linked polymer, and at least one of the cathode layer and the anode layer may include an elemental metal. In such cases, the electrochemical cell may remain dimensionally stable and retain electrochemical performance after storage in air at ambient temperature and humidity for at least 30 days. The cathode layer may have a thickness of at least 20 µm, and/or the anode layer may have a thickness of at least 20 µm. The electrolyte layer may have a thickness less than 20 µm.

In various embodiments of the present invention, the cathode layer may comprise a first material providing a cathodic electric transport, charge storage or redox function. In addition, the anode layer may comprise a second material providing an anodic electric transport, charge storage or redox function. Furthermore, at least one of the cathode layer and the anode layer may comprise the ionic liquid, an electrolyte salt, and/or a transport-enhancing additive. For example, each of the cathode layer, electrolyte layer, and anode layer may include the ionic liquid, the electrolyte salt and/or the transport-enhancing additive.

In some of the embodiments of the present invention, the electrochemical cell may further comprise a first current collector in contact with the cathode layer, and a second current collector in contact with the anode layer. Additionally, the electrochemical cell may be a printed battery cell.

A further aspect of the present invention concerns an electrolyte ink that comprises an ionic liquid having a hydrophilic or hydrophobic anion, a multi-valent metal cation suitable for use in an electrochemical cell, a polymer binder that mechanically supports the electrolyte, and a solvent having a hydrophilicity, hydrophobicity or polarity similar or matched to that of the anion, or forming hydrogen bonds with the anion. The polymer binder may have a porosity, swellability and/or impregnability enabling infusion, impregnation or doping with the ionic liquid and the multi-valent metal cation.

In various embodiments, the ionic liquid may comprise the hydrophilic anion, and the solvent may form hydrogen bonds with the hydrophilic anion. Alternatively or additionally, when the ionic liquid includes the hydrophilic anion, the hydrophilic anion may contain one or more atoms with a lone electron pairs that form strong hydrogen bonds. The solvent and the anion may form strong hydrogen bonds with each other. In some embodiments, the electrolyte ink may comprise water. In various embodiments, the ionic liquid may include a cation selected from the group consisting of imidazolium, pyrrolidinium and tetraalkyl ammonium, and the anion may be selected from the group consisting of methanesulfonate, trifluoromethanesulfonate, toluenesulfonate, tetrachloroborate, formate, acetate, propionate, perchlorate and nitrate. In other embodiments in which the ionic liquid comprises the hydrophobic anion, the polymer binder may be hydrophobic. In such embodiments, the ionic liquid may include a cation selected from the group consisting of imidazolium, pyrrolidinium, pyridinium and tetraalkyl ammonium, and the anion may be selected from the group consisting of bis(methylsulfonyl)imide, bis(trifluoromethylsulfonyl)imide, trialkyl borate, tetraaryl borate, and $C_6$-$C_{20}$ carboxylate.

In addition, the electrolyte ink may further comprise a solid filler. The solid filler may be a solid inorganic filler, which may be selected from the group consisting of silica, alumina, an aluminosilicate, titanium dioxide, zinc oxide, and combinations thereof. The anion may form hydrogen bonds with the solid (inorganic) filler. Additionally or alternatively, the anion may form hydrogen bonds with the polymer binder. The polymer binder may include an —OH group, an —NH group, an —F group, or an —SH group, and the anion may have at least one atom with a lone pair of electrons.

Furthermore, the multi-valent metal cation may include a counterpart anion that forms hydrogen bonds with the polymer binder. The polymer binder may have a hydrophilicity or hydrophobicity similar or matched to that of the counterpart anion.

In various embodiments, the electrolyte ink may further comprise an additive selected from the group consisting of carbonates, glycerol carbonates, glycols, sugar alcohols, glycerol, polyols, ethylene oxides, propylene oxides, polymers and copolymers of ethylene and propylene oxides, ethers (e.g., glyme or other glycol ether or diether), nitriles (e.g., acetonitrile), fluorinated carbonates, and fluorinated ethers in an amount of 0.001-15% by weight (or other range, such as 0.001-10% by weight, within this range) of the electrolyte. In addition, the polymer binder may include a polyester, a polyaniline, a polyether, a polyimide, or a polymer or copolymer of difluoroethylene, trifluoroethylene, tetrafluoroethylene, vinylidene chloride, an ethylene oxide, acrylic acid, methacrylic acid, and/or an acrylate and/or methacrylate ester, or a blend thereof. Furthermore, the solvent may be included in an amount that is more than 10% by weight of the electrolyte.

In addition, the electrolyte ink may further comprise a transport-enhancing species selected from the group consisting of carbonates, glycols, ethylene oxides, propylene oxides, polymers and copolymers of ethylene and propylene oxides, ethers (e.g., glycol ethers and diethers), nitriles, fluorinated carbonates, and fluorinated ethers, in an amount <10% by weight of the electrolyte. The solvent may have a hydrophilicity or hydrophobicity similar or matched to that of the IL anion. In some embodiments, the solvent and the IL anion may be hydrophilic. For example, the solvent may comprise a $C_1$-$C_4$ mono-, di- and/or trialkylamine, N-methylpyrrole, N-methylpyrrolidine, N-methylpyrrolidone, N-methylpiperidine, N-methylimidazole, pyridine, or an aqueous salt thereof.

An even further aspect of the present invention concerns a method of making an electrolyte that comprises mixing an ionic liquid comprising a hydrophilic or hydrophobic anion, a salt containing a multi-valent metal cation suitable for use in an electrochemical cell, a polymer binder, optional additives, and a solvent to form a mixture, and forming a layer on a substrate from the mixture. The layer may be a layer in an electrochemical device (such as a battery) or a free-standing electrolyte sheet. The solvent, and optionally the polymer binder, have a hydrophilicity or hydrophobicity matched to that of the anion. The electrolyte layer may be printed (e.g., from an ink including a volatile solvent, in addition to the ionic liquid, multi-valent metal cation, polymer binder, and electrolyte solvent). Alternatively, the polymer binder may be formed (e.g., by printing or coating), and the remaining components deposited thereon (e.g., by printing an ink containing such components).

In various embodiments, the method of making an electrolyte may comprise mixing a solid inorganic filler with the ionic liquid, the multi-valent metal cation, the polymer binder, and the solvent. The polymer binder and/or (when present) the solid inorganic filler may have a hydrophilicity or hydrophobicity matched to that of the anion, or may form hydrogen bonds with the anion. The method may further comprise drying the electrolyte at a temperature and for a length of time sufficient to remove substantially all of the volatile solvent from the ink. The volatile solvent may have a boiling point of less than 200° C. (e.g., ≤150° C. or other value less than 200° C.).

A still further aspect of the present invention concerns a method of making an electrochemical cell that comprises forming one of a cathode layer and an anode layer on or over a substrate, forming the electrolyte layer on the cathode layer or anode layer (e.g., by the method of making an electrolyte as described above), and forming the other of the cathode layer and the anode layer on the electrolyte layer. Forming the electrolyte layer may comprise printing the electrolyte layer. Printing the electrolyte layer may include printing an ink including the components of the electrolyte layer in a volatile solvent. Forming one of the cathode layer and the anode layer may include printing one of the cathode layer and the anode layer, and forming the other cathode layer or the anode layer may include printing the other of the cathode layer and the anode layer.

The method further may include forming a first current collector on or over the substrate prior to forming the cathode layer or the anode layer, and forming a second current collector on the other of the cathode layer and the anode layer. Forming the first current collector may comprise printing the first current collector, and forming the second current collector may comprise printing the second current collector.

Further aspects of the electrolyte, electrochemical cell and methods are described in greater detail below and may be summarized in the Claims that follow the detailed description. These and other advantages of the present invention will become readily apparent from the detailed description of various embodiments below.

DETAILED DESCRIPTION

Figure 1:
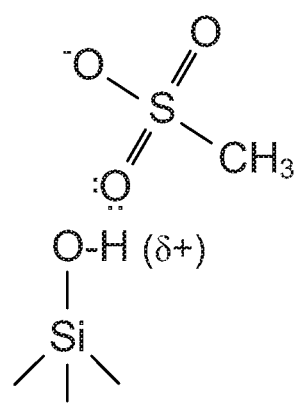
FIG. 1 depicts an exemplary hydrogen bond between a surface hydroxyl group and a mesylate anion.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and materials have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

Various embodiments are illustrated in the context of a printable multi-valent metal ion electrochemical cell, in which the metal ions travel through a gel electrolyte. The skilled artisan will readily appreciate, however, that the materials and methods disclosed herein will have application in a number of other contexts where multi-valent (e.g., divalent or trivalent) or monovalent ion transport is applicable or desirable, and that other systems (based on monovalent or divalent ion transport, or other ion transport systems of higher valency) are also suitable for use in the present invention. This invention applies to structures that are deposited on foils, plastic substrates, fabrics (woven and nonwoven) and/or papers, as well as in cases where underlying and overlying elements have barrier properties to the outflow of cell species. This invention may be useful in cases where the elements of the electrochemical cell are not necessarily impermeable to species in the electrolyte.

In this disclosure, the terms "negative electrode" and "anode" are used interchangeably, and use of one term generally includes the other, but both terms may be used to mean "anode." Likewise, the terms "positive electrode" and "cathode" are used interchangeably, and use of one term generally includes the other, but both terms may be used to mean "cathode." In this disclosure, the term "current collector" refers to a conductive element in contact with the anode or cathode.

Exemplary Electrolytes

The present application discloses the effects of different ionic liquids and their influence on multi-valent ion (and, in some specific embodiments, zinc) ionogel and composite ionogel electrolytes. In other embodiments, the ions may be aluminum, magnesium, nickel, copper, or other multi-valent ions. The properties of multi-valent ionogels are different from single-valence systems based on lithium, sodium, or potassium ions, due to the more complex interactions between the multi-valent ions with the polymer and ionic liquid(s), and when present, with certain additives in the system. A specific ionic liquid may influence the properties of a multi-valent ionogel electrolyte through one or more of the following effects and/or properties: its hydrophilicity or hydrophobicity, hydrogen bonding character, ionicity, fragility, ion conductivity and thermal stability, the charge transfer ability of its cation(s) and/or anion(s), and when the ionic liquid is a polymeric ionic liquid, its porosity, swellability, ability to permeate and/or dissolve, and/or impregnability.

Hydrophilic versus Hydrophobic Effects

Cations and anions can be uniquely combined to form ionic liquids with specific physiochemical and electrochemical properties. The anions tend to strongly influence the hydrophilic-hydrophobic properties of the ionic liquids.

The distinction between hydrophilic and hydrophobic species is not always precise, but can in one aspect be defined with respect to the species' interaction with water. For example, a hydrophilic species may be one whose interactions with water and other polar substances are more thermodynamically favorable than their interactions with oil or other hydrophobic solvents (e.g., alkanes or arenes), and vice versa for hydrophobic species. Alternatively, a species that freely dissolves in or is freely miscible with water can be considered hydrophilic, and a species that has limited solubility in or miscibility with water can be considered hydrophobic.

Polarity can be defined as a separation of electric charge in a molecule or other chemical species that leads to the molecule or its constituent groups having an electric dipole or multipole moment. These dipole or multipole moments can be summed for a given species or molecule to determine or estimate its polarity. Species having similar polarities may have similar dipole or multipole moment(s), and species having dissimilar polarities may have significantly different dipole or multipole moment(s). Polar molecules and species tend to interact through dipole-dipole intermolecular forces and/or hydrogen bonds, whereas non-polar molecules and species tend to interact through Van der Waals forces.

Example mobile ionic species that may be included in an electrolyte and that can function as an ionic liquid include cation and anion combinations including one or more of the organic cations imidazolium, pyrrolidinium, pyridinium, tetraalkyl ammonium and piperidinium and/or one or more of the inorganic ions Li, Zn, Na, Al, Mn and Mg, and one or more anions such as organosulfonate (e.g., methanesulfonate [mesylate], trifluoromethanesulfonate [triflate], toluenesulfonate [tosylate], etc.), organosulfimide (e.g., bis((methyl)sulfonyl)imide [mesylate sulfimide, or MSI]), bis(trifluoromethylsulfonyl)-imide [TFSI]), sulfate, phosphate, organophosphate, organoborate (e.g., trialkyl borate, chelated organoborate, bis(oxalo)borate, etc.), tetrachloroborate, aluminate, dicyanamide, carboxylate (e.g., formate, acetate), perchlorate, nitrate and halide (e.g., chloride, bromide, iodide).

A list of common ionic liquids containing various inorganic and organic anions and their properties is provided below, categorized into those having relatively hydrophilic properties and those having relatively hydrophobic properties.

Ionic Liquids Having Relatively Hydrophilic Anions 1-butyl-3-methylimidazolium perchlorate
1-butyl-3-methylimidazolium hydroxide
1-butyl-3-methylimidazolium trifluoromethanesulfonate
1-butyl-3-methylimidazolium methanesulfonate
1-butyl-2,3-dimethylimidazolium methanesulfonate
1-butyl-2,3-dimethylimidazolium trifluoromethanesulfonate
1-butyl-1-methylpyrrolidinium methanesulfonate
1-butyl-1-methylpyridinium methanesulfonate
1-butyl-1-methylpyridinium trifluoromethanesulfonate
1-ethyl-1-methylpyrrolidinium methanesulfonate
1-ethyl-1-methylpyrrolidinium trifluoromethanesulfonate
1-methyl-1-propylpyrrolidinium methanesulfonate
1-ethyl-1-methylpyrrolidinium trifluoromethanesulfonate
1-ethyl-3-methylimidazolium (EMIM) methanesulfonate
1-ethyl-3-methylimidazolium (EMIM) hydroxide
1-ethyl-3-methylimidazolium (EMIM) trifluoromethanesulfonate
1-butyl-3-methylimidazolium (BMIM) formate
1-butyl-2,3-dimethylimidazolium formate
1-butyl-1-methylpyrrolidinium formate
1-butyl-3-methylimidazolium acetate
1-butyl-1-methylpyrrolidinium acetate
1-butyl-1-methylpyrrolidinium trifluoromethanesulfonate
1-butyl-1-methylpyrrolidinium tetrachloroborate
1-butyl-1-methylpyridinium tetrachloroborate
1-ethyl-1-methylpyrrolidinium tetrachloroborate
1-ethyl-3-methylimidazolium tetrachloroborate
1-ethyl-1-methylpyrrolidinium trifluoromethanesulfonate
1-methyl-1-propylpyrrolidinium tetrachloroborate
1-methyl-1-propylpyrrolidinium trifluoromethanesulfonate
1-butyl-3-methylimidazolium propionate
1-butyl-1-methylpyrrolidinium propionate Ionic Liquids Having Relatively Hydrophobic Anions 1-butyl-3-methylimidazolium tetraphenylborate
1-butyl-3-methylimidazolium bis(fluorosulfonyl)imide 1-butyl-3-methylimidazolium bis(trifluoromethane)sulfonimide
1-butyl-2,3-dimethyllimidazolium tetraphenylborate
1-butyl-2,3-dimethyllimidazolium bis(fluorosulfonyl)imide
1-butyl-2,3-dimethyllimidazolium bis(trifluoromethane)sulfonimide
1-butyl-3-methylimidazolium bis((methyl)sulfonyl)imide
1-butyl-2,3-dimethyllimidazolium bis((methyl)sulfonyl)imide
1-butyl-3-methylimidazolium bis((methyl)sulfonyl)amide
1-butyl-1-methylpyrrolidinium bis((methyl)sulfonyl)imide
1-butyl-1-methylpyrrolidinium bis(fluorosulfonyl)imide
1-butyl-1-methylpyrrolidinium bis(trifluoromethane)sulfonimide
1-butyl-1-methylpyridinium bis((methyl)sulfonyl)imide
1-ethyl-1-methylpyrrolidinium bis((methyl)sulfonyl)imide
1-ethyl-1-methylpyrrolidinium bis(fluorosulfonyl)imide
1-ethyl-1-methylpyrrolidinium bis(trifluoromethane)sulfonimide
1-ethyl-3-methylimidazolium bis((methyl)sulfonyl)imide
1-ethyl-3-methylimidazolium bis(fluorosulfonyl)imide
1-ethyl-3-methylimidazolium bis(trifluoromethane)sulfonimide
1-methyl-1-propylpyrrolidinium bis((methyl)sulfonyl)imide
1-methyl-1-propylpyrrolidinium bis(fluorosulfonyl)imide
1-methyl-1-propylpyrroldinium bis(trifluoromethane)sulfonimide
1-butyl-2,3-dimethylimidazolium bis((methyl)sulfonyl)amide
1-butyl-2,3-dimethylimidazolium bis(fluorosulfonyl)imide
1-butyl-2,3-dimethylimidazolium bis(trifluoromethane)sulfonimide
1-butyl-1-methylpyrrolidinium bis((methyl)sulfonyl)amide
1-butyl-1-methylpyridinium bis((methyl)sulfonyl)amide
1-butyl-1-methylpyrrolidinium bis(fluorosulfonyl)imide
1-butyl-1-methylpyrrolidinium bis(trifluoromethane)sulfonimide
1-ethyl-1-methylpyrrolidinium bis((methyl)sulfonyl)amide
1-ethyl-3-methylimidazolium bis((methyl)sulfonyl)amide
1-ethyl-1-methylpyrrolidinium bis(fluorosulfonyl)imide
1-ethyl-1-methylpyrrolidinium bis(trifluoromethane)sulfonimide
1-methyl-1-propylpyrrolidinium bis(methylsulfonyl)amide
1-methyl-1-propylpyrrolidinium bis(fluorosulfonyl)imide
1-methyl-1-propylpyrroldinium bis(trifluoromethane)sulfonimide
1-butyl-3-methylimidazolium hexanoate
1-butyl-1-methylpyrrolidinium hexanoate Within a given cation family (e.g., imidazolium), anions of different hydrophobicity or hydrogen bonding character may be investigated for a particular electrochemical system. For example, EMIM trifluoromethanesulfonate (triflate), which is hydrophilic, and EMIM bis(trifluoromethylsulfonyl)imide, which is hydrophobic, may be combined with various different binders, solvents, and other components (e.g., fillers and/or ion transport additives) in an electrolyte, and the various electrolytes can be compared in a given system for effectiveness.

Ionic liquids with relatively hydrophilic anions (such as triflate) encourage a relatively high water content, which improves ionic conductivity and electrode reaction kinetics relative to ionic liquids with relatively hydrophobic anions (such as bis(trifluoromethylsulfonyl)imide). Water can also form hydrogen bonds with IL anions having lone pairs of electrons, such as triflate and bis(trifluoromethane)sulfonimide (also known as bis(trifluoromethylsulfonyl)imide and bis(trifluoromethylsulfonyl)amide). Thus, water may be a beneficial component (e.g., as a solvent or ion transport additive) in the present ionogel when the ionic liquid contains a hydrophilic anion or an anion with hydrogen bonding character, in which the hydrogen protons of the water molecule associate with, for example, the lone electron pairs of an oxygen, sulfur, fluorine or nitrogen atom in the polymer or of a sulfur, fluorine or nitrogen atom in the solvent.

The concentration of water in the electrolyte can affect performance of an electrochemical cell. The effect of differing concentrations of water in a polymer gel electrolyte is quite interesting. Water is an active (e.g., strong) proton acceptor (and donor), and can increase or decrease the association and/or dissociation of ions in the electrolyte. Generally, the higher the concentration of water in the electrolyte, the greater the dissociation of ions (e.g., in the metal salt and/or ionic liquid) in the electrolyte. Water also contributes to the cross-linking of the polymer and interactions between the various ions in the polymer gel electrolyte.

It has been observed that ionic liquids having a hydrophilic or strong hydrogen bonding anion in a film made from a hydrophobic binder (e.g., a copolymer of a hydrofluoroalkene and perfluoropropene) show quicker onset of syneresis sweating or leaching from the film in comparison to ionic liquids having a hydrophobic or weak hydrogen bonding anion. This may be due to temperature changes or absorption of water from the atmosphere (e.g., humidity), which can cause the hydrophobic binder to swell or contract, thereby forcing or squeezing liquid out (e.g., syneresis, or "sweating" of the ionic liquid). Matching the hydrophobicity or hydrogen bonding character of the anion in the ionic liquid to the hydrophobicity or hydrogen bonding character of the polymer binder in the ionogel can match at least some of the physical and/or chemical properties of the materials, and reduce or eliminate the loss of ionic liquid from the electrolyte.

A similar effect is observed with solvents. The more hydrophilic the solvent, the more likely it is to absorb water from the atmosphere, and the more likely its thermal properties will not match those of a hydrophobic binder. These effects in an ionogel may be greater in a multi-valent cation system due to stronger associations of the multi-valent cation with moisture or water molecules.

The solvent can also play a role in the anodic stability of the electrolyte. For example, the choice of solvent can affect or change the solvation structure (e.g., ion solvation and ionic association) at the level of molecular interactions among the various components in the electrolyte. The choice of solvent can also affect the dynamics and transport properties (e.g., the diffusion coefficient and ionic conductivity) of the electrolyte. In some cases, the choice of solvent can be a predominant and/or limiting factor on the anodic stability of the electrolyte (e.g., by associating with ionic liquid anions or metal salt ions).

For example, the first solvation shell around the multi-valent metal ion (e.g., $Zn^{2+}$) can include or be formed using oxygen and/or nitrogen atoms from IL anions, the solvent, and/or the multi-valent metal salt anions. Generally, the smaller the size of the anions and/or solvent molecules with O-donor and/or N-donor atoms, the stronger the interaction with the multi-valent metal ion (e.g., $Zn^{2+}$).

The morphology and properties of the gel and/or polymer electrolyte may also be affected by the type and amount of polymer, electrolyte salt, and solvent. The solvent type (e.g., its polarity [nonpolar or polar, which can be weakly polar or strongly polar], which can be characterized by its dipole moment in debyes) plays an important role in controlling gel polymer film conformations. Different solvents not only provide different crystallization conditions, but also have various dipolar intermolecular interactions with other components in an electrolyte. During polymer crystallization, polar solvents (e.g., N-methyl pyrollidone [NMP], dimethyl formamide [DMF], dimethylacetamide [DMAc], triethyl phosphate [TEP], etc.) may facilitate rotation of relatively strong dipoles of polar bonds (e.g., C—F, C—Cl, C=O, etc.) of a polymer. Therefore, the energy required to form a polar crystal is reduced in the presence of a polar solvent, and certain polymer conformations (e.g., an all-trans conformation) may be easier to form. The gel and/or polymer electrolyte film may display higher porosity, better swellability, and greater impregnability when a polar solvent is present. However, nonpolar or weakly polar solvents (e.g., cyclohexanone) have a lower dipole moment and may lack an ability to exchange or match polar sites with, or rotate polar bonds in, the polymer. Thus, the higher the polarity of the solvent, the greater intermolecular interactions between the solvent and a polymer having polar bonds. In addition, the Lewis acid-base interaction(s) between the electrolyte salt (e.g., a salt of a multivalent metal such as zinc) and the polar bond(s) of a polar solvent may play a vital role in the enhancement of ionic conductivity in the electrolyte film.

Exemplary Approaches for Improving Hydrogen Bonding Effects in an Ionic Liquid Electrolyte The interaction between the ionic liquid and a solid filler in a composite ionogel can influence the properties of the ionogel. The cations and anions of the ionic liquid can form extended hydrogen bond networks while in the liquid state. For example, the trifluoromethanesulfonate (triflate) anion of an EMIM triflate ionic liquid can form hydrogen bonds with certain polymers (e.g., having O—H or N—H bonds) and solid fillers such as silica and alumina (which often have surface O—H groups) in a composite ionogel. As a result, such fillers and ionic liquids may form a more mechanically stable and physically robust composite film, resulting in less ionic liquid leaching out of the ionogel over time.

Similarly, the cation of an ionic liquid can form hydrogen bonds, and can also interact with the solid fillers to influence the composite ionogel properties. Depending on the type of ionic liquid, the system can be "cation-dominant" or "anion-dominant." Using, for example, a copolymer of a hydrofluoroalkene and a perfluoropropene as a host polymer in a polar solvent, different ionic liquids can be separately infused into the host polymer, and the mechanical and electrical properties of the resulting electrolytes can be determined. For example, ionogel films containing an ionic liquid having 1-ethyl-3-methylimidazolium (EMIM) cations therein typically show similar ionic conductivity and relatively similar mechanical and electrochemical properties, and these properties scale with the relative amount of ionic liquid (e.g., the ionic liquid to polymer ratio). Thus, ionic liquids having EMIM cations form "cation-dominant" ionogels and electrolytes. Other cations may also form "cation-dominant" ionogels and electrolytes.

On the other hand, ionic liquids with relatively hydrophilic anions and/or anions with lone electron pairs which promote hydrogen bonding encourage higher water content (e.g., in the solvent, ionic liquid, ionogel and/or electrolyte). More specifically, hydrophilic anions have a higher hydrogen bonding tendency with a larger [more negative] enthalpy for hydrogen bonding. Increasing the water content improves ionic conductivity and electrode reaction kinetics relative to ionic liquids having more hydrophobic anions. This also suggests water as a beneficial component in a polymer-based ionogel, which may be cross-linked and/or include solid-phase filler particles therein. Polar, "water-like" additives such as ethylene glycols, sugar alcohols, glycerol, etc., may also be useful. Polar additives having hydroxyl (O—H), amine (N—H) and sulfhydryl (S—H) groups can also form hydrogen bonds with IL anions having lone pairs of electrons. In the present disclosure, an additive is a component present in a relatively small amount, such as 0.001-10% by weight (or any other amount or range of amounts therein, such as 0.01-5% by weight) of the total amount of polymer binder, filler, ionic liquid and multivalent ion source.

Ionic liquids having anions with a —$SO_3$ group or moiety, such as tosylate or mesylate, participate in hydrogen bonding (as hydrogen bond acceptors) at the —$SO_3$ group, which contains a large number of electron pairs in its constituent atoms' valences that can be hydrogen bond acceptors. Furthermore, it is also possible for such anions to have a strong attraction to the surface of various fillers, such as silica, alumina and other solid inorganic fillers. For example, such anion-filler surface interactions may occur through hydrogen bonding with filler surface hydroxyl groups. FIG. 1 shows a hydrogen bond interaction between a silica surface hydroxyl group (hydrogen bonding donor) and a mesylate group (with hydrogen bonding acceptor sites). Similar interactions can occur on other oxide surfaces (e.g., $TiO_2$, ZnO, etc.) and/or with other anions (e.g., triflate, bis(trifluoromethylsulfonyl)imide, etc.).

Hydrogen bonding effects between anions in the ionic liquid and/or multi-valent metal ion source (e.g., a salt of a multi-valent metal) with high hydrogen bonding character and network-forming polymers such as polymers and copolymers containing, for example, ethylene oxide units, alcohols (e.g., hydroxyethyl acetate groups), phenols (e.g., polyvinylphenol, PVP), and/or carboxylic acid groups (e.g., polyacrylates and polymethacrylates) can also lead to improved electrolyte gel stability, higher electrolyte solubility in the gel, and improved transport. Many polymer binders containing oxygen and/or nitrogen atoms with lone pairs of electrons or with hydroxyl or amine groups are also capable of forming hydrogen bonds with other components of the electrolyte (e.g., a solvent or additive containing hydroxyl or amine groups, or oxygen and/or nitrogen atoms with lone pairs of electrons, respectively).

General ionogel gelation effects, which include hydrogen bonding, and specific oxide surface bonding effects can be enhanced in ionic liquids and metal salts containing strong hydrogen bond formers (such as tosylate versus bis((methyl)sulfonyl)imide, $BCl_4$ and other less strong hydrogen bond formers). For example, the hydrogen bond enthalpies of particular anions can be compared, and ionic liquids and multi-valent metal ion sources having anions with a relatively high hydrogen bond enthalpy (e.g., ≤−11−[−15] kJ/mol or any value therein, such as −12 kJ/mol, −12.5 kJ/mol, −13 kJ/mol, etc.) can be matched with a polymer binder and/or inorganic filler component (e.g., in a non-hydrogen-bonding polymer binder) having complementary hydrogen bonding groups. For example, an ionic liquid having a tosylate or mesylate anion can be matched with a polymer binder having OH groups, such as PVP or cellulose, or with a hydrophobic polymer (e.g., a hydrofluoroalkene-perfluoropropene copolymer) having an oxide filler therein, such as silica, alumina, ZnO, etc. This promotes high ionic liquid and salt solubility and gel stability of an electrolyte gel (e.g., an ionogel) containing one or more high hydrogen-bonding character anions versus an otherwise identical gel containing one or more anions with lower hydrogen bonding character. Hydrogen bonding of the ionic liquid/multi-valent metal source anion(s) to an oxide filler may also reduce the bonding or binding strength between the anion(s) and the metal ions in the electrolyte (e.g. Zn, Li, Mg, Al), in turn enhancing the mobility of the metal ions in the electrolyte.

Exemplary Approaches for Improving the Charge Transfer Ability of the Ionic Liquid Ionogels (which may be cross-linked and/or that may further contain a solid particulate filler) can function as a cathode binder. Physical stability is an important concern in electrochemical cell cathodes, as the size of active particles in the cathode increases over time (e.g., as a result of electrochemical cycling, which can put complicated compressive and shear strains on cathode particle/binder interfaces and cathode binder/collector interfaces). Furthermore, in bottom cathode configurations, cathode swelling and saturation with ionic liquids can lead to liquid accumulation at the cathode/collector interface, and mechanical and electrical delamination. Such delamination is detrimental to the function of an electrochemical cell such as a battery cell, so configurations that reduce or minimize cathode swelling and cathode saturation with ionic liquids may be quite useful.

Dimensional stability of the films in an electrochemical cell leads to easier processing, particularly in applications such as printed multilayer batteries. The hydrophobicity, hydrophilicity and/or polarity compatibility of constituents in an electrolyte may be critical to maintain good, reliable dimensional stability, which facilitates and/or promotes processes such as printing subsequent layer(s) onto a printed layer.

Ionogels can also be bonded and/or crosslinked with one or more materials in an electrode and/or current collector, and in particular, an electrode and/or current collector layer that has a linkable component therein. For example, polymers and copolymers having —OH groups, such as hydroxyethyl acetate groups and phenols, useful as a polymer binder in the electrode(s) and/or current collector(s) can be linked to an oxide filler such as silica, alumina, $TiO_2$, ZnO, etc. in the ionogel by acid- or base-catalyzed esterification/etherification (or by other known chemistry for forming a covalent bond between an —OH oxygen atom and an inorganic oxide filler or support particle). Such an approach may be particularly useful for linking relatively thick cathodes to the ionogel, due to the increased total volume of liquid available for syneresis and detrimental accumulation at the interfaces of the cathode to the ionogel and corresponding current collector. Alternatively or additionally, polymers and copolymers having —OH groups in the ionogel or current collector can be linked to a metal oxide particle or support in the current collector.

An ionogel (cross-linked or not) having relatively high solubility (e.g., in the ionic liquid and metal salt) and/or stable liquid holding capability may also be useful for devices having a relatively thick cathode (e.g., ≥20 µm, 30 µm, 50 µm, or any other value >20 µm), where ionic access to regions of the cathode relatively distant from the cathode-electrolyte interface is more difficult. Enhancing ionic liquid and/or electrolyte salt content in the cathode can help improve conductivity within the cathode and result in more accessible battery capacity at higher discharge rates.

Ionogels can also function as an anode binder. All of the above discussion of ionogels as a cathode binder also applies to the anode layer and the anode current collector. In this case, improved suppression of metal dendrite formation due to the mechanical and chemical nature of the ionogel as a binder can be beneficial. The improved metal ion conductivity within the anode (e.g., a relatively thick anode) may also facilitate metal re-plating further into the anode, preventing the accumulation and/or growth of metal particles at the anode/electrolyte interface. This metal accumulation effect can reduce the accessible anode surface area, slowing electrode reactivity with the electrolyte, and even leading to electrical and mechanical disconnection of the anode metal and the corresponding current collector due to metal loss in the anode regions closer to the anode current collector after cycling.

Zinc metal is highly reactive with certain species in the ambient (it can readily oxidize or react with moisture in the air). However, examples of cross-linked ionogels have been observed to be very stable in ambient conditions. If left in air at ambient temperature, pressure and humidity for 7-30 (or more) days, the cross-linked ionogel remains dimensionally stable (no sweating or shape change detected) and usable, and it maintains its electrochemical performance even after storage in ambient conditions for >30 days. Thus, the present ionogel may be relatively insensitive to the ambient environment, and if used as a binder, it may protect a zinc electrode from reacting with oxidizing species in the environment.

Ionogels may enable formation of relatively thin electrolyte layers (e.g., <20 µm, 15 µm, 10 µm, or any other maximum thickness less than 20 µm) and electrochemical cells due to the improved mechanical stability of the ionogel. A relatively thin ionogel film may be as mechanically robust as a relatively thick, but otherwise identical, ionogel (i.e., without the inorganic oxide filler). Also, the increased mechanical strength and impact of the inorganic oxide filler (e.g., $SiO_x$ particles) may further reduce dendrite growth in the electrodes of an electrochemical cell.

Ionogels in printed layers of electrochemical devices can further enable thinner electrolytes, electrodes and thinner current collectors, as the insolubility of the processed (i.e., printed) layer suppresses dissolution by or into subsequently printed ink layers. In cases without this effect, a relatively thin electrolyte can dissolve at least in part in a subsequently printed ink and become mechanically and/or electrically unstable.

Example polymers that may be useful as a binder in the present ionogel or ionogel (as well as in an electrode and/or a current collector) include polymers and copolymers of trifluoroethylene, tetrafluoroethylene, vinylidene chloride, vinylidene difluoride (difluoroethylene), hexafluoropropylene, styrene, butadiene, ethylene oxides, acrylate and/or methacrylate esters, variations and rubbers thereof, etc., as well as polyesters, polyanilines, polyethers, polyimides, copolymers and blends thereof, etc. However, other polymers are also expected to have a porosity, swellability and/or impregnability enabling infusion, impregnation, percolation or doping with the ionic liquid and/or the multi-valent metal cation. The solvent is generally included in an amount that is more than 10% by weight (e.g., 20-80% by weight, or any value or range of values that is more than 10% by weight) of the mixture of components (e.g., the binder, ionic liquid and multi-valent metal ion source) in the electrolyte.

Example solvents that may be useful in the present ionogel or ionogel (as well as in an electrode and/or a current collector) may include mono-, di- and/or trialkyl- and/or -arylamines and aqueous salts thereof, N-methylpyrrole, N-methylpyrrolidone (NMP), N-methylpyrrolidine, N-methylpiperidine, N-methylimidazole, pyridine, organophosphates and aqueous salts thereof, organophosphites and aqueous salts thereof, halogenated alkanes, cycloalkanes and arenes, combinations thereof with water, etc. Mixtures of such solvents with other high boiling point solvents (including polar solvents having a boiling point at 1 atm of >150° C., >200° C., or >250° C.) can also be included. The solvent is generally included in an amount that is more than 10% by weight (e.g., 20-80% by weight, or any value or range of values that is more than 10% by weight) of the mixture of components (e.g., the binder, ionic liquid, multi-valent metal ion source, and solvent) in the electrolyte.

Example ion transport-enhancing species that may be present in the electrolyte or electrodes include materials and/or additives such as carbonates (e.g., ethylene carbonate, propylene carbonate, and linear alkyl carbonates), glycerol carbonates, glycols (e.g., ethylene glycol, diethylene glycol, polyethylene glycols, propylene glycol and oligomers thereof), sugar alcohols and polyols, ethylene oxides, propylene oxides, polymers and copolymers of ethylene and propylene oxides, ethers, fluorinated carbonates, and fluorinated ethers. Such ion transport-enhancing species having lone pairs of electrons (e.g., carbonates) can form hydrogen bonds with IL anions or cations having hydroxyl, amine or sulfhydryl groups, and ion transport-enhancing species having hydroxyl groups (e.g., glycols) can form hydrogen bonds with IL anions or cations having lone pairs of electrons.

Example electrode compositions to which the binder, ionic liquid and/or additive can be added include metal oxides such as $MnO_2$, vanadium oxide, cobalt oxides, ternary metal oxides, spinel oxides, titanium dioxide, etc. Such metal oxides may be conductive in their native state or after conventional doping. The polymer that can be added to the electrode composition may be an ionic vehicle or electronic conductor (in addition or as an alternative to the polymer binder).

The present formulations may also be used with solid inorganic electrolytes, alone or combined with semipermeable or ionic soluble electrode and/or current collector compositions.

Exemplary Electrochemical Cells

Figure 2:
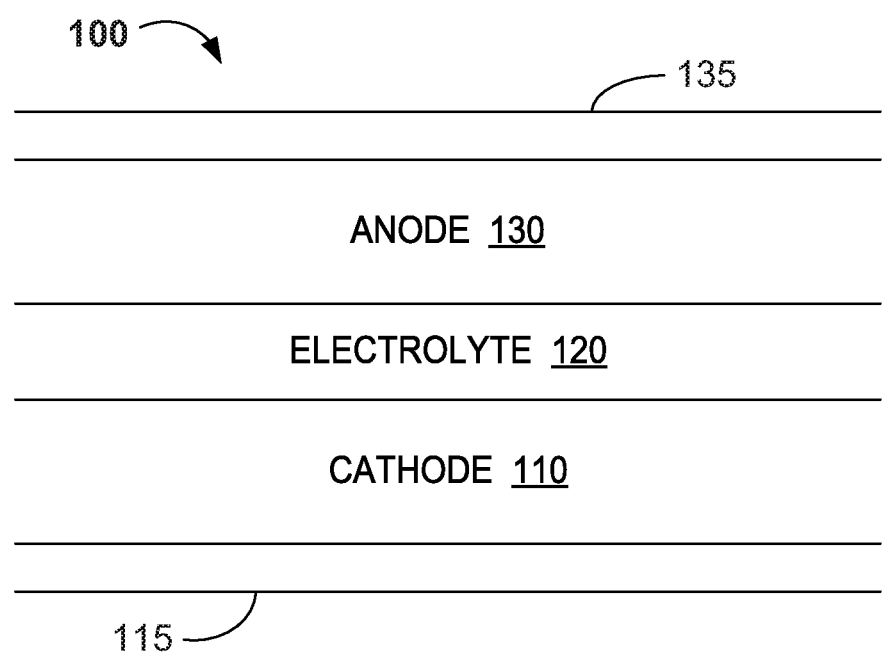
FIG. 2 shows a diagram of the layers in an exemplary electrochemical cell.

An example electrochemical cell 100 is shown in FIG. 2. The electrochemical cell 100 includes a cathode 110, an electrolyte layer 120, and an anode 130. The electrochemical cell 100 may further include current collectors 115 and 135, in physical and/or electrical contact with the cathode 110 and the anode 130, respectively. In one embodiment, each of the cathode 110, electrolyte layer 120, anode 130 and current collectors 115 and 135 are printed on a substrate (not shown). For example, all cell layers may be printed by stencil printing using an ink containing a volatile solvent (e.g., having a boiling point of <150° C., <100° C., or less than any other maximum temperature <150° C.), and dried in a convection oven (air) at a temperature and for a length of time sufficient to remove substantially all of the volatile solvent from the ink (e.g., 50-100° C. for 10-30 minutes).

Advantageous formulations for the electrolyte 120 may also contain solvents, polymers and other additives that may replace some of the ionic species or the polymer binder. Molarities of the ionic liquid and the multi-valent metal salt (considering only the fraction of the volume that contains the ionic liquid and soluble multi-valent metal salt) can vary from 10^-1 M to 5 M (for either component or a composite mixture).

Formulations for the current collectors 115 and 135 may be based on ~70% conductor loading by volume, but lower percentages may also be possible, as well as composites of different metals, carbon, graphite, carbon nanotubes (CNT), graphene, etc. The same formulations can also be used for the anode 130, such as a Zn powder-based printed anode layer, using the densities of Zn and any binders and/or additives present. A similar formulation can be used for the cathode 110, substituting, for example, the densities and molecular weights of $MnO_2$ or other metal oxide and adding a set of fields and data for conductive additives, such as carbon AB and graphite, which can be used in cathode formulations. One feature of these formulation calculations is that they maintain the same concentrations of ionic species in the electrolyte 120 and in other layers in the battery.

Increasing electrolyte concentration and electrolyte conductivity, and in some cases, electrode ionic conductivity and suppression of outdiffusion of ionic electrolyte components into adjacent layers in a layered battery cell structure is of particular interest when the adjacent electrode and current collector layers may contain regions which have some solubility or provide a mobile path for diffusion or drift of ionic species into these layers that can ultimately reduce the ionic conductivity and performance of the cell (see, e.g., U.S. Pat. No. 9,276,292, the relevant portions of which are incorporated herein by reference). An example system where this occurs is a cell based on a polymer electrolyte that contains one or more mobile ionic species such as an ionic liquid (e.g., BMIM, EMIM or pyrrolidone bis(methylsulfonyl)imide, bis(trifluoromethylsulfonyl)imide, methanesulfonate, etc.), a metal salt (e.g., zinc tetrachloroborate, zinc bis(trifluoromethylsulfonyl)imide, zinc nitrate, zinc chloride, etc.), an organic salt (e.g., other than the ionic liquid) and/or an ionic complexing agent. When such electrolyte layers are surrounded by electrode or current collector layers that contain materials that have a finite solubility for the ionic or solvating species in the electrolyte, these species and/or materials can diffuse into the other layers. Certain active materials and polymer binders may have a finite solubility for these species.

In one particularly advantageous embodiment, the electrochemical cell is a Zn battery. Zn batteries generally have a high efficiency (e.g., on the order of 99%), and any Zn deposition on Zn metal electrodes or current collectors is reversible, especially in non-aqueous Zn electrolytes. The activation barrier energy for $Zn^{2+}$ ion migration in a Zn battery is relatively low in a variety of cathode materials (e.g., $MnO_2$, $NiO_2$, $V_2O_5$, $FePO_4$, etc.). $Zn^{2+}$ ions have an ionic radius similar to $Li^+$ and $Mg^{2+}$. In addition, the volumetric capacity of a Zn battery is higher than batteries based on other multi-valent metals (e.g., Ca, Mg).

Other Concepts and Inventive Ideas Related to this Invention

The concepts herein extend not only to electrolytes, but also to electrodes and current collectors, especially printed and coated electrodes and current collectors. Printed current collectors are relatively rare, as foil collectors are typically used in the battery industry. Electrolyte doping to prevent diffusion, swelling, and function loss in electrodes and current collectors (e.g., from components in the electrolyte) may be useful, since printed conductors are typically metal particles in a matrix that may have a solubility and/or permeability for species in the electrolyte that should remain in the active regions of the battery. Also, since it may be advantageous to dope the electrodes with such electrolyte components, there may be a problem of loss of those dopants to the next adjacent layer (i.e., the current collector).

Cross-linking of the dopants and other species in the binder networks of the electrodes and collectors can stabilize the motion of these materials, preventing them from transporting in or out of the cell, and thereby stabilizing their blocking effect on the outflow of ionic and solvating species from interior layer(s) in the cell (i.e., the electrolyte or electrodes). Furthermore, use of polymer-tethered counterions (e.g., in the metal salt) in printed and/or coated cell

What is claimed is:

1. An electrolyte, comprising:
   an ionic liquid;
   a multi-valent metal cation;
   a polymer binder, mechanically supporting the ionic liquid and the multi-valent metal cation and comprising one of an —OH group, an —NH group, an —SH group, or an —F group;
   a solid filler,
      wherein the ionic liquid, the polymer binder, and the solid filler are all either hydrophilic or hydrophobic; and
   water, wherein a concentration of the water in the electrolyte is between 0.1% and 5% by weight.

2. The electrolyte of claim 1, wherein the polymer binder has a porosity enabling infusion with the ionic liquid and the multi-valent metal cation.

3. The electrolyte of claim 1, wherein the solid filler comprises one of titanium dioxide, zinc oxide, or combinations thereof.

4. The electrolyte of claim 1, further comprising an organic solvent in an amount that is more than 10% by weight of the electrolyte, wherein the ionic liquid, the polymer binder, and the solid filler, and the organic solvent are all either hydrophilic or hydrophobic.

5. The electrolyte of claim 4, wherein the organic solvent is selected from the group consisting of $C_1$-$C_4$ mono-, di- and/or trialkylamine, N-methylpyrrole, N-methylpyrrolidine, N-methylpyrrolidone, N-methylpiperidine, N-methylimidazole, pyridine, and an aqueous salt thereof.

6. The electrolyte of claim 4, wherein the organic solvent is represented by a formula $(RO)_3PO_x$, where each R is one of a $C_1$-$C_4$ alkyl or phenyl.

7. The electrolyte of claim 1, wherein an additive selected from the group consisting of a carbonate, a glycerol carbonate, a glycol, a sugar alcohol, a glycerol, a polyol, an ethylene oxide, a propylene oxide, a polymers or a copolymer of ethylene oxide, a polymers or a copolymer of propylene oxides, an ether, a fluorinated carbonate, and a fluorinate ether.

8. The electrolyte of claim 7, wherein a concentration of the additive in the electrolyte is between 0.001% and 15% by weight.

9. The electrolyte of claim 1, wherein the ionic liquid comprises a cation selected from the group consisting of imidazolium, pyrrolidinium, pyridinium and tetraalkyl ammonium and further comprises an anion may be selected from the group consisting of bis(methylsulfonyl)imide, bis(trifluoromethylsulfonyl)imide, trialkyl borate, tetraaryl borate, and $C_6$-$C_{20}$ carboxylate.

10. The electrolyte of claim 1, wherein the polymer binder comprises one of an —OH group, an —NH group, or an —SH group.

11. The electrolyte of claim 1, wherein the ionic liquid comprises triflate or bis(trifluoromethane)sulfonimide.

12. An electrochemical cell, comprising:
   a cathode layer;
   an electrolyte layer, comprising the electrolyte of claim 1; and
   an anode layer, wherein the electrolyte layer is disposed between and in contact with the cathode layer and the anode layer.

13. The electrochemical cell of claim 12, wherein the solid filler comprises one of titanium dioxide, zinc oxide, or combinations thereof.

14. The electrochemical cell of claim 12, wherein at least one of the cathode layer and the anode layer comprises an elemental metal, and said electrochemical cell remains dimensionally stable and retains electrochemical performance after storage in air at ambient temperature and humidity for at least 30 days.

15. The electrochemical cell of claim 12, wherein the electrochemical cell is a printed battery cell.

16. An electrolyte ink, comprising:
   an ionic liquid;
   a multi-valent metal cation;
   a polymer binder, mechanically supporting the ionic liquid and the multi-valent metal cation and comprising one of an —OH group, an —NH group, an —SH group, or an —F group;
   a solid filler;
   a solvent,
      wherein the ionic liquid, the polymer binder, the solid filler, and solvent are all either hydrophilic or hydrophobic; and
   water, wherein a concentration of the water in the electrolyte ink is between 0.1% and 5% by weight.

17. The electrolyte ink of claim 16, wherein the polymer binder has a porosity enabling infusion with the ionic liquid and the multi-valent metal cation.

18. The electrolyte ink of claim 16, wherein the solid filler comprises one of titanium dioxide, zinc oxide, or combinations thereof.

19. A method of making an electrolyte layer, the method comprising:
   mixing an ionic liquid, a multivalent metal cation, a polymer binder, a solid filler, a solvent, and a water thereby forming a mixture,
      wherein the polymer binder comprises one of an —OH group, an —NH group, an —SH group, or an —F group,
      wherein the ionic liquid, the polymer binder, the solid filler, and solvent are all either hydrophilic or hydrophobic, and
      wherein a concentration of the water in the mixture is between 0.1% and 5% by weight; and
   forming the electrolyte layer on a substrate from the mixture.

20. The method of claim 19, wherein forming the electrolyte layer comprises printing the electrolyte layer.

21. The method of claim 19, wherein the solid filler comprises one of titanium dioxide, zinc oxide, or combinations thereof.

22. A method of making an electrochemical cell, comprising:
  forming one of a cathode layer and an anode layer on or over a cell substrate,
  forming an electrolyte layer on the one of the cathode layer and the anode layer by the method of claim 19, and
  forming the other of the cathode layer and the anode layer on the electrolyte layer.

* * * * *